(12) United States Patent
Guim Bernat

(10) Patent No.: US 12,045,466 B2
(45) Date of Patent: Jul. 23, 2024

(54) ADAPTIVE STORAGE SCHEDULER FOR SSD

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 936 days.

(21) Appl. No.: 16/861,551

(22) Filed: Apr. 29, 2020

(65) Prior Publication Data

US 2020/0257456 A1 Aug. 13, 2020

(51) Int. Cl.
*G06F 3/06* (2006.01)
*G06F 9/48* (2006.01)

(52) U.S. Cl.
CPC .......... *G06F 3/0611* (2013.01); *G06F 3/0637* (2013.01); *G06F 3/0653* (2013.01); *G06F 3/0659* (2013.01); *G06F 3/0679* (2013.01); *G06F 9/4881* (2013.01)

(58) Field of Classification Search
CPC .... G06F 3/0611; G06F 3/0637; G06F 3/0653; G06F 3/0659; G06F 3/0679; G06F 3/0613; G06F 9/4881; G06F 13/18
See application file for complete search history.

(56) References Cited

U.S. PATENT DOCUMENTS

| | | | |
|---|---|---|---|
| 8,880,836 B2 * | 11/2014 | Owa | G06F 3/0661 711/170 |
| 9,552,297 B2 * | 1/2017 | Traut | G06F 12/0862 |
| 2015/0169449 A1 * | 6/2015 | Barrell | G06F 12/0862 711/143 |
| 2018/0150257 A1 * | 5/2018 | Griffith | G06F 3/0626 |
| 2019/0101880 A1 * | 4/2019 | Guim Bernat | G06F 12/0238 |

* cited by examiner

*Primary Examiner* — Kalpit Parikh
(74) *Attorney, Agent, or Firm* — Essential Patents Group, LLP

(57) ABSTRACT

An embodiment of an electronic apparatus may include one or more substrates, and logic coupled to the one or more substrates, the logic to receive a current access request for a storage media associated with a stream, identify a hint in the current access request which indicates one or more stream characteristics for future access requests from the stream, and handle the current access request based on the indicated one or more stream characteristics for future access requests from the stream. Other embodiments are disclosed and claimed.

11 Claims, 7 Drawing Sheets

ADAPTIVE STORAGE SCHEDULER FOR SSD

BACKGROUND

A solid state drive (SSD) may have a variety of specifications including performance specifications, thermal specifications, and reliability/endurance specifications. Performance specifications include criteria such as input/output operations per second (IOPS), throughput/bandwidth, and latency. The Nonvolatile Memory (NVM) Express (NVMe) specification (nvmexpress.org) describes various features related to utilization of streams for access to a storage device.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
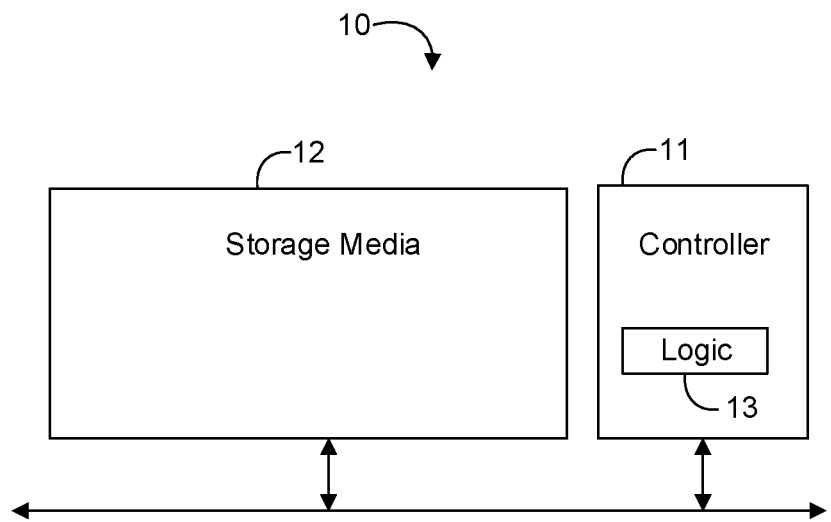
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

With reference to FIG. 1, an embodiment of an electronic system 10 may include storage media 12, and a controller 11 communicatively coupled to the storage media 12. The controller 11 may include logic 13 to receive a current access request for the storage media 12 associated with a stream, identify a hint in the current access request which indicates one or more stream characteristics for future access requests from the stream, and handle the current access request based on the indicated one or more stream characteristics for future access requests from the stream. For example, the logic 13 may be configured to determine one or more of a latency and bandwidth requirement for the stream based on the hint, to determine a priority for the stream based on the hint, and/or to determine a granularity of access requests for the stream based on the hint. In some embodiments, the logic 13 may be further configured to schedule the current access request based on the indicated one or more stream characteristics for future access requests from the stream. For example, the logic 13 may also be configured to combine the current access request with one or more of the future access requests from the stream. In any of the embodiments herein, the storage media 12 may comprise persistent storage media, such as a solid state drive (SSD).

Embodiments of each of the above controller 11, storage media 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a storage controller, a memory controller, a microcontroller, a general purpose processor, a special purpose processor, a central processor unit (CPU), an execution unit, etc. In some embodiments, the storage media 12, the logic 13, and/or other system memory may be located in, or co-located with, various components, including the controller 11 (e.g., on a same die).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C #or the like and conventional procedural programming languages, such as the "C" programming language or similar programming languages. For example, the storage media 12, other storage media, or other system memory may store a set of instructions which when executed by the controller 11 cause the system 10 to implement one or more components, features, or aspects of the system 10 (e.g., the logic 13, receiving the current access request for the storage media 12 associated with the stream, identifying the hint in the current access request, handling the current access request based on the hint for the stream, etc.).

Figure 2:
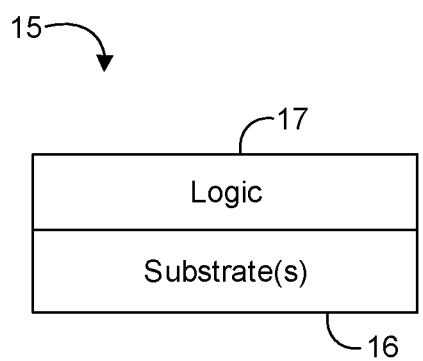
FIG. 2 is a block diagram of an example of an electronic apparatus according to an embodiment.

Turning now to FIG. 2, an embodiment of an electronic apparatus 15 may include one or more substrates 16, and logic 17 coupled to the one or more substrates 16. The logic 17 may be configured to receive a current access request for a storage media associated with a stream, identify a hint in the current access request which indicates one or more stream characteristics for future access requests from the stream, and handle the current access request based on the indicated one or more stream characteristics for future access requests from the stream. For example, the logic 17 may be configured to determine one or more of a latency and bandwidth requirement for the stream based on the hint, to determine a priority for the stream based on the hint, and/or to determine a granularity of access requests for the stream based on the hint. In some embodiments, the logic 17 may be further configured to schedule the current access request based on the indicated one or more stream characteristics for future access requests from the stream. For example, the logic 17 may also be configured to combine the current access request with one or more of the future access requests from the stream. In any of the embodiments herein, the storage media may comprise a SSD.

Embodiments of the logic 17 may be implemented in a system, apparatus, computer, device, etc., for example, such as those described herein. More particularly, hardware implementations of the logic 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C #or the like and conventional procedural programming languages, such as the "C" programming language or similar programming languages.

For example, the logic 17 may be implemented on a semiconductor apparatus, which may include the one or more substrates 16, with the logic 17 coupled to the one or more substrates 16. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 16 with transistor channel regions that are positioned within the substrate(s) 16. The interface between the logic 17 and the substrate(s) 16 may not be an abrupt junction. The logic 17 may also be considered to include an epitaxial layer that is grown on an initial wafer of the substrate(s) 16.

Figure 3A:
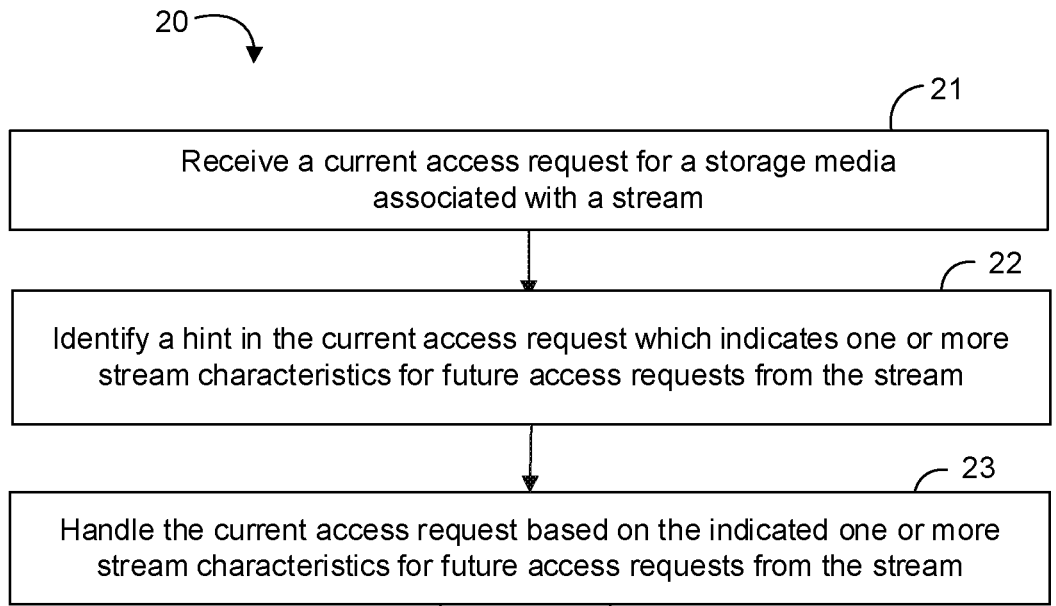
FIGS. 3A to 3C are flowcharts of an example of a method of controlling storage according to an embodiment.
Figure 3B:
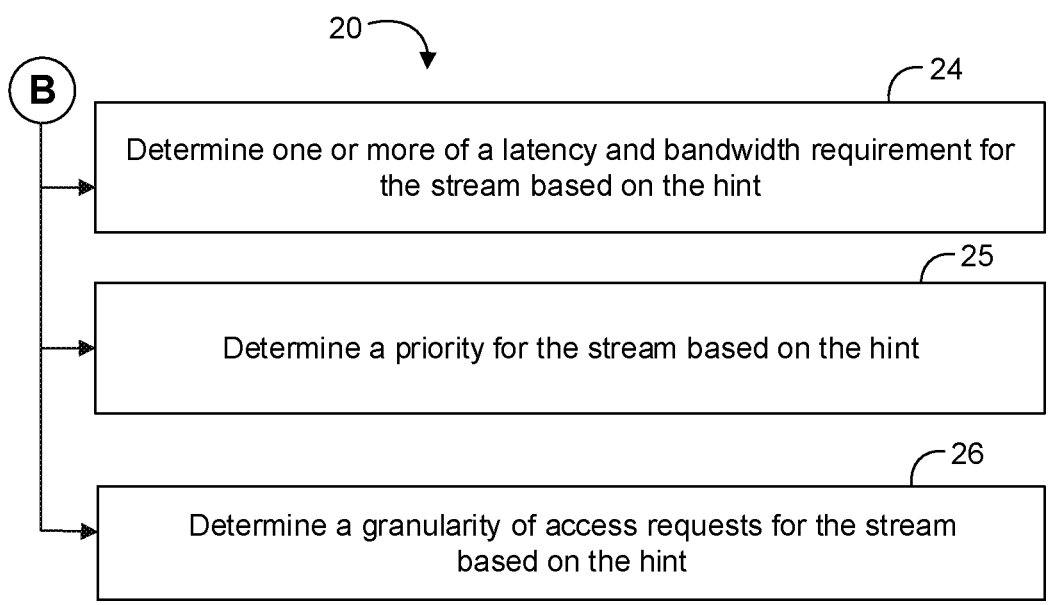
Figure 3C:
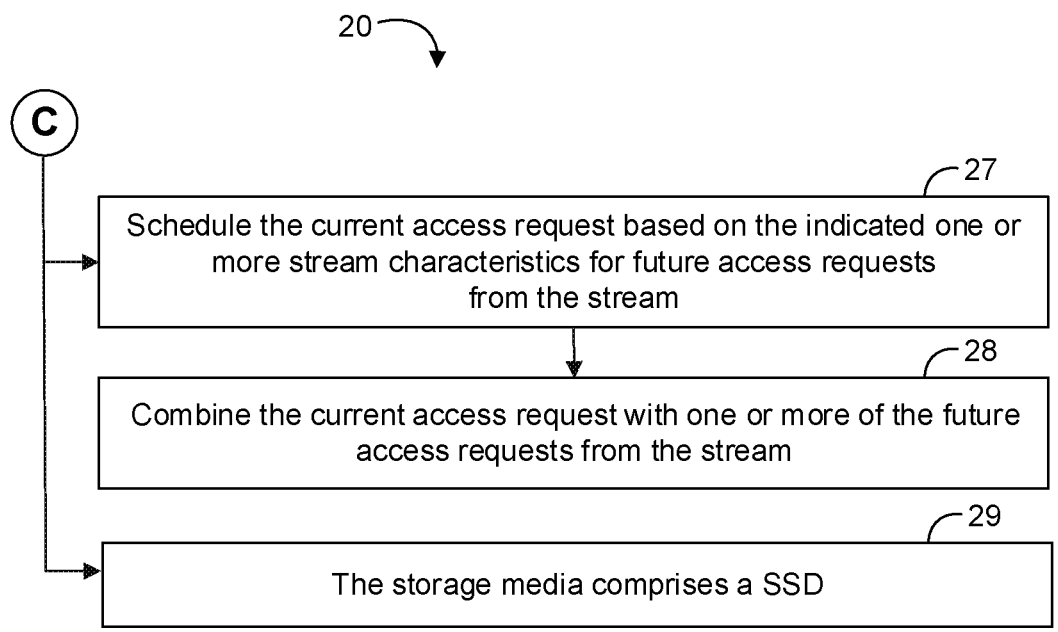

Turning now to FIGS. 3A to 3C, an embodiment of a method 20 of controlling storage may include receiving a current access request for a storage media associated with a stream at block 21, identifying a hint in the current access request which indicates one or more stream characteristics for future access requests from the stream at block 22, and handling the current access request based on the indicated one or more stream characteristics for future access requests from the stream at block 23. For example, the method 20 may include determining one or more of a latency and bandwidth requirement for the stream based on the hint at block 24, determining a priority for the stream based on the hint at block 25, and/or determining a granularity of access requests for the stream based on the hint at block 26. Some embodiments of the method 20 may further include scheduling the current access request based on the indicated one or more stream characteristics for future access requests from the stream at block 27. For example, the method 20 may also include combining the current access request with one or more of the future access requests from the stream at block 28. In any of the embodiments herein, the storage media may comprise a SSD at block 29.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C #or the like and conventional procedural programming languages, such as the "C" programming language or similar programming languages.

For example, the method 20 may be implemented on a computer readable medium as described in connection with Examples 22 to 28 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide adaptive storage scheduling technology for emerging workloads with relaxed latency requirements. By way of background and not limitation, a data center may provide storage services across a wide variety of uses cases including, for example, edge cloud services, internet-of-thing (IoT) applications, manufacturing, manned aviation, unmanned aerial transport, autonomous and assisted vehicles, health-monitoring, smart surveillance, and so on. Some embodiments may advantageously provide technology for efficient management, movement, and sharing of data among many different devices, many of which are themselves portions of larger device conglomerates.

Some conventional memory and storage systems may be less efficient when reading or writing to the media with different granularities and/or service level agreement (SLA) requirements because they lack sufficient information from the software entities (e.g., services or devices) about the expected data streams. In accordance with some embodiments, several writes coming from devices or services arriving to the storage device may be merged before getting written into the media depending on the latency and bandwidth requirements and the granularity at the storage device after messages are sent from the service or device. For example, if a first device is sending consecutive 128B writes every 1 ms to the storage media and has low prior latency requirements, and the storage media writes 512B payloads to the media, the media may hold 4 writes in a buffer during 4 ms and write to the storage media after the buffer is full. In another example, if a second device is sending 64B writes and has high latency requirements, every 64B write request to storage may go straight to the media. In some conventional memory and storage systems, several read requests for small data sizes from the same entity (e.g., service or device) generate independent small storage requests which may result in poor resource utilization. In accordance with some embodiments, if a service is accessing at a granularity of 64 bytes every 0.5 ms with low latency requirements, multiple reads may be combined in a single data packet from the storage to the platform.

Some embodiments may provide more scalable, tiered and power efficient architectures (e.g., by providing efficient inter-operation with accelerators in edge and IoT deployments). Some embodiments may permit different priorities and SLAs, in an agile manner, such that whether to process a given request as part of a batch or to dispatch it immediately may be based on a real-time control loop, where the determination may be readily decided, specified, and implemented, end to end. Some embodiments may provide efficient data storage schemes for data payloads of different granularities (i.e., 64 bytes, 4 KB, 1 MB etc.). To achieve one or more of the foregoing, some embodiments may provide technology to allow entities to provide hints to the storage device that the storage device may utilize to implement more efficient data path return policies from the storage device to the entity, and/or to implement adaptive and more efficient write policies to the media based on latency, bandwidth, SLA, and other stream characteristics hints (e.g., granularities).

In some embodiments, a storage or memory device may include technology to use service or device hints on the data streams characteristics to implement smart request processing at the storage/memory device (e.g., local platform storage, just a bunch of disks (JBOD), etc.). For example, the hints may be utilized to provide more efficient data reads and writes from/to the storage media while meeting the various SLAs of the applications.

Figure 4:
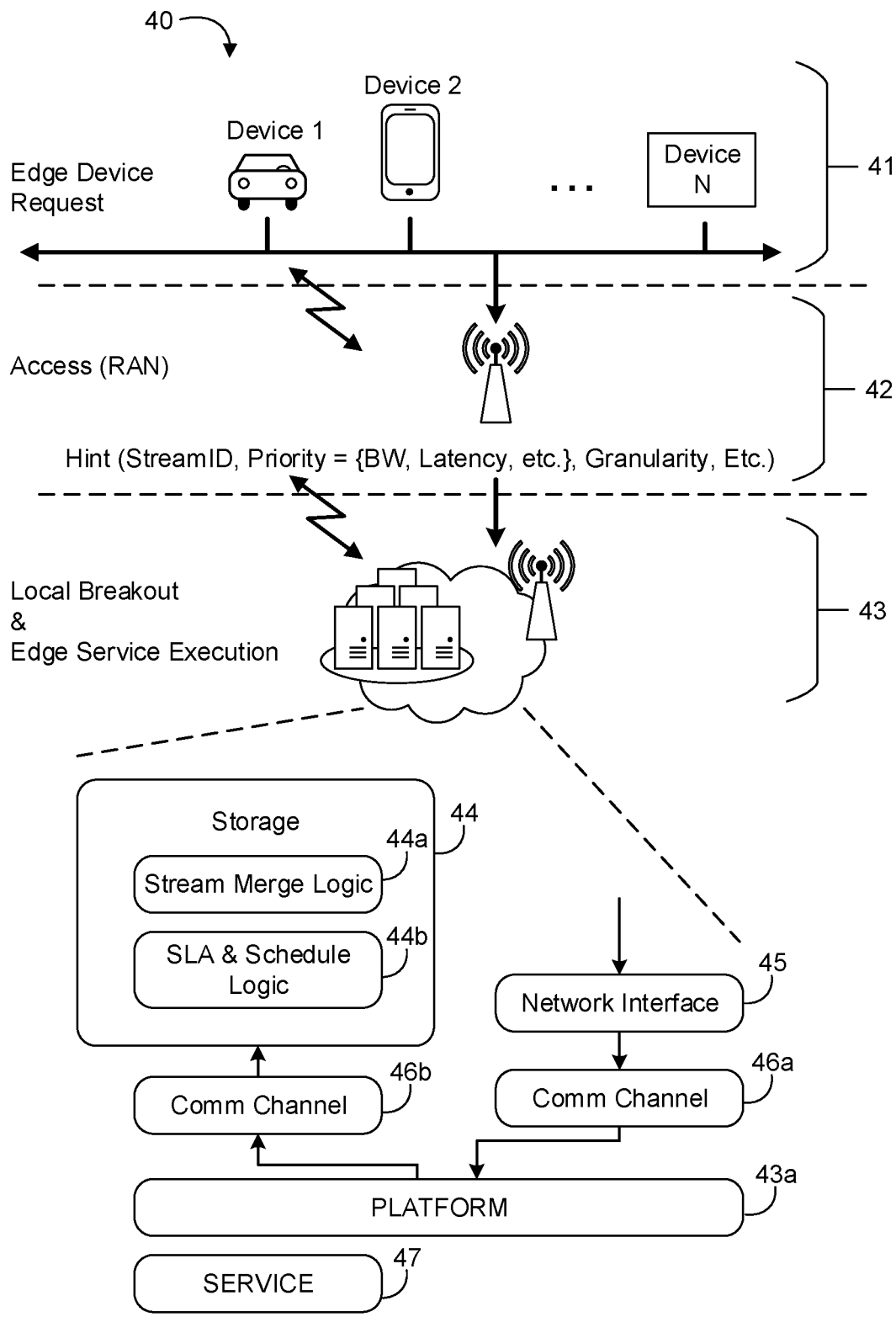
FIG. 4 is a block diagram of an example of a distributed computing environment according to an embodiment.

With reference to FIG. 4, a distributed computing environment 40 may include edge devices 41 (e.g., Device 1 through Device N, where N>1) which communicate edge device requests through an access point of a radio access network (RAN) 42 to a local breakout and/or edge service execution platform 43 (e.g., which may include on-premise equipment, cloudlets, etc.). The respective edge devices 41 may have different characteristics and/or requirements. For example, Device 1 (e.g., a car) may have the following characteristics: Latency SLA=High; low band width (LBW) SLA=Med; Traffic Type=WR Chunks 64B. Device 2 (e.g., a mobile phone) may have the following characteristics: Latency SLA=Med; LBW SLA=Low; Traffic Type=WR Chunks 128B. Other edge devices 41 may have other characteristics. In accordance with some embodiments, the edge devices 41 may provide hints about these and/or other characteristics associated with a stream identifier (e.g., StreamID) through the RAN 42 to the local breakout and/or edge service execution platform 43. For example, a datacenter may include a storage device 44 which is configured to merge write payloads based on stream and SLA hints into media buffers, and to merge reads to be returned to the platform based on stream and SLA hints into media buffers. For example, the storage device 44 may include stream merge logic 44a and SLA & schedule logic 44b configured to merge respective read & write payloads based on stream hints.

In some embodiments, a network interface 45 (e.g., a network interface card (NIC), a 5G card, a cellular V2X card, etc.) may be configured to receive the hints (e.g., nominally formatted as Hint (StreamID, Priority={BW, Lat, . . . }, Granularity)) and utilize a communication channel 46a (e.g., a compute express link (CXL) interconnect, PCIE, etc.) which is configured to propagate streams hints (e.g., SLAs, message granularity, etc.) from the network interface 45 to a platform 43a. Another communication channel 46b may be configured to propagate stream hints from the platform 43a to the storage device 44. In addition to the edge devices 41, other devices or services may make access requests to the storage device 44 through the platform 43a. For example, a service 47 may have the following characteristics: Latency SLA=Low; LBW SLA=Low; Traffic Type=RD Chunks 64B.

In accordance with some embodiments, two types of hints may be provided by edge devices 41 or service(s) 47 (e.g., the devices/services may be in the same edge platform or may be issuing requests from outside the platform itself). A first type of hint may indicate how quickly payloads coming from particular streams need to be written into the storage device 44 (e.g., an overall stream bandwidth requirement and a minimum latency per each individual request or group(s) of requests). Handling a particular stream will depend on an amount data that needs to be stored into media during a given period of time, an injection rate for that stream, and the latency SLA associated to each individual request. A second type of hint may indicate how quickly read requests from a particular stream need to be returned to the client. In this case, similar to writes, handling a particular stream may depend on how much data needs to be returned to the client and the SLA associated to each individual request. For both types of hints, less restrictive latency SLAs per request may provide more options for the stream merge logic 44a of the storage device 44 to merge different requests (e.g., from the same stream) to the device 44 or from the device 44 to the platform 43a (e.g., or network in case of JBOD).

Advantageously, some embodiments of a storage/memory device may include logic to utilize either/both types of hints to schedule and combine read and write requests per each of the streams in order to improve or maximize bandwidth utilization of a link to the platform and a link to the particular storage media. In some embodiments, the logic may be implemented in a storage or memory controller (e.g., which may be locally attached, network attached, pooled, etc.). Some embodiments may be particularly beneficial for dynamic integration of multiple devices, including devices in distributed systems, for flexible and prioritized handling of requests at CPUs, GPUs, accelerators, etc.

Figure 5:
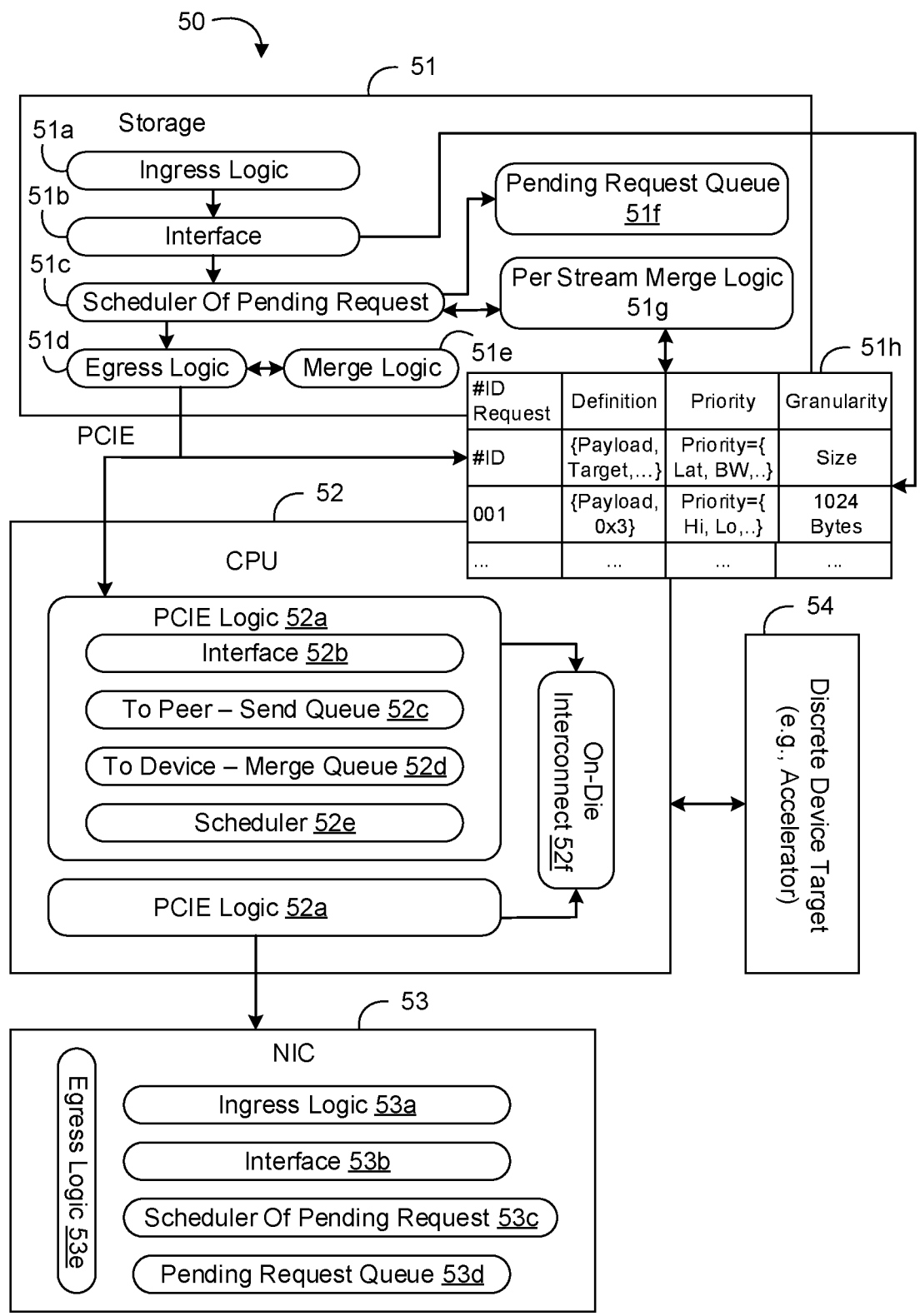
FIG. 5 is a block diagram of an example of a computing system according to an embodiment.

With reference to FIG. 5, an embodiment of a computing system 50 may include a storage device 51 communicatively coupled to a CPU 52 (e.g., via PCIE), which is also communicatively coupled to a NIC 53 and a discrete device target 54 (e.g., an accelerator). The storage device 51 may include ingress logic 51a, an interface 51b, a scheduler of pending requests 51c, egress logic 51d, merge logic 51e, a pending request queue 51f, and per stream merge logic 51g, coupled as shown. The CPU 52 may include PCIE logic 52a and an on-die interconnect (ODI) 52f, coupled as shown. Each PCIE logic 52a may include an interface 52b, a to-peer-send queue 52c, a to-device-merge queue 52d, and a scheduler 52e. The NIC 53 may include ingress logic 53a, an interface 53b, a scheduler of pending requests 53c, a pending request queue 53d, and egress logic 53e.

In accordance with some embodiments, each discrete intermediary device in the computing system 50 (e.g., such as the NIC 53) may be configured with logic that allow a sender (e.g., such as a networking client) to communicate priority and granularity for processing the sender's request at the intermediary device and also at a subsequent receiver. The particular implementation may be different for different discrete devices, but embodiments of a discrete intermediary device may include technology to provide the following capabilities visible from a sender's standpoint: an ingress queue, a pending request queue, and a scheduler.

Requests submitted by a sender or a sending device that the sender wants to route to a device or devices at other peers may be received into the ingress queue. In accordance with some embodiments, the ingress logic may be interfaced with logic for processing the incoming requests according to a priority for that request (e.g., specified a multi-metric vector based on latency, BW, etc.) and a desired granularity for sending to a target device (e.g., to improve or maximize performance, PCIE link utilization, etc.). For example, the submitted requests may be entered into the pending queue request, ordered by priority. In some embodiments, the priority of the requests may be recomputed as time advances. For example, requests with low priority may, typically, get their priority increased over time. In some embodiments, the priority of a request maybe computed as a formula. For example, the formula may take into account various sub-priorities for different performance parameters, power, efficiency parameters, etc. In one example, a low-latency class (e.g., a speed parameter) may be given 80% weight, and a bandwidth parameter may be given 20% weight (e.g., to reflect that achieving fast response requires minimizing queuing time). The pending-queue requests may be scheduled by a scheduler (e.g., the scheduler of pending requests 53c for the pending request queue 53d of the NIC 53). The scheduler may generally pick the first pending request (e.g., when possible) and process that request. For example, processing the request may cause the request to be sent to a target (e.g., the CPU 52 in this example) via an egress point (e.g., the egress logic 53e for the NIC 53).

At the CPU 52 (e.g., or another target device), the PCIE logic 52a may be configured with stream hint logic for its roles as both a sender and as a receiver. When operating as a sender, the PCIE logic 52a may be configured to provide technology for the interface 52b to enqueue requests with specified priority, granularity, etc. based on stream hints in the requests, the to-peer-send queue 52c to store pending requests, and the scheduler 52e to select which of the pending requests on the queue 52c are sent to the target PCIE Logic (e.g., managing the target device). When the scheduler 52e selects a request, for example, the scheduler 52e may send a message header with priorities, granularity, etc. to the PCIE logic block managing the target device. The scheduler 52e may then start processing the request by sending one or more ODI packets to the target PCIE logic block until all of the original payload is transmitted. Advantageously, multiple requests from the queue that target different PCIE logic blocks (e.g., different devices or CPUs) may be processed at the same time. Various policies or heuristics may govern spreading out requests among different targets such as saturation at the ODI for the targets, alternating latency sensitive requests versus bandwidth sensitive requests, etc. In the earlier example, the logic may decide to alternate messages to the ODI from transactions 1 and 2 in different batches of 64 bytes (e.g., or the ODI channel bandwidth).

When operating as a receiver (e.g., processing receive request from the PCIE logic 52a), the PCIE logic 52a may be configured to provide technology the to-device-merge queue 52d to store the inflight requests coming from the peer PCIE Logic block which map to a particular device transaction. For example, the queue 52d may store all the coming payloads coming from the ODI and peer PCIE Logic. The queue 52d may be further configured to merge and send the payloads. For example, the queue 52d may include logic to map payloads arriving into the queue 52d at the ODI granularity into payloads at equal/higher granularity, depending on, for example, the granularity specified through the interface 52b, the supported granularity for the link, and/or the priority of the different pending requests. Where the discrete device is the target, the discrete device target may process input messages as usual in accordance with the normal operation of the device.

In some embodiments, the ingress logic 51a may provide technology for an ingress queue into the storage device 51. A platform may submit requests that the platform wants to route to storage media of the storage device to the ingress logic 51a. The interface 52b may include logic to process the incoming requests in the ingress queue according to a first interface for the an incoming request to specify one or more characteristics associated to a particular stream (e.g., where the characteristics may include latency (per request), bandwidth (for the overall stream), SLA associated to the particular stream (for both read and write flows), hints on the expected size of the payloads sent to be written to the storage, etc.), and according to a second interface for the incoming request to submit a read and/or write request to the storage media. For example, the read and write interfaces may be extended for the request to specify the stream ID, an optional latency SLA for that request (e.g., which may default to a priority from the ingress logic 51a), and a payload in the case of a write request.

In some embodiments, the merge logic 51e may include technology to support a content addressable memory (CAM) structure per each of the streams (e.g., up to a maximum number of streams supported in the logic) that holds all the write request that have not yet been sent to the media. Each CAM may include an address of the request to be written to the memory or storage, a cycle when the request arrived, and a payload In some embodiments, the scheduler of pending requests 51c may include logic to process each new request. When a write request arrives to the storage device 51, for example, the latency SLA for that particular stream may be checked. For example, various portions of the logic of the storage device 51 may create or add entries/values to a table 51h with stream characteristics from the hints saved in association with stream IDs. Those portions and other portions may then look up information from the table 51h to identify what hints/information may be available for a stream based on its stream ID. If the latency SLA value in the table 51h for a particular stream indicates that the request should be submitted to the media as soon as possible, the request goes to the non-delayed request logic for the device. If the latency SLA value in the table 51h for a particular stream indicates that the request may be delayed, the request may be stored in the per stream merge logic 51g. The logic of the scheduler 51c may go through all the pending request in the per stream merge logic 51g every cycle and select the request per each request that needs to be written to the media. The scheduler 51c may prioritize requests that can be combined based on the bus size to the media. Every cycle, the logic of the scheduler 51c may select the requests that are submitted finally to the media. The final selection may be based on the priority for the streams and based on the SLAs established for the streams. The logic of the scheduler 51c may perform the merging of the selected payloads from the CAM and submit it to the media.

The egress logic 51d may include logic to implement a similar process as the scheduler 51c, but for the data to be returned to the network or the platform. The egress logic 51d may cooperate with the merge logic 51e (e.g., that may be implemented similarly as a CAM) for data to be returned to the platform. For example, each CAM may include: an address of the request to be written to the memory or storage; a cycle when the request arrived, a payload, and schedule logic to merge requests on the CAM.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 6:
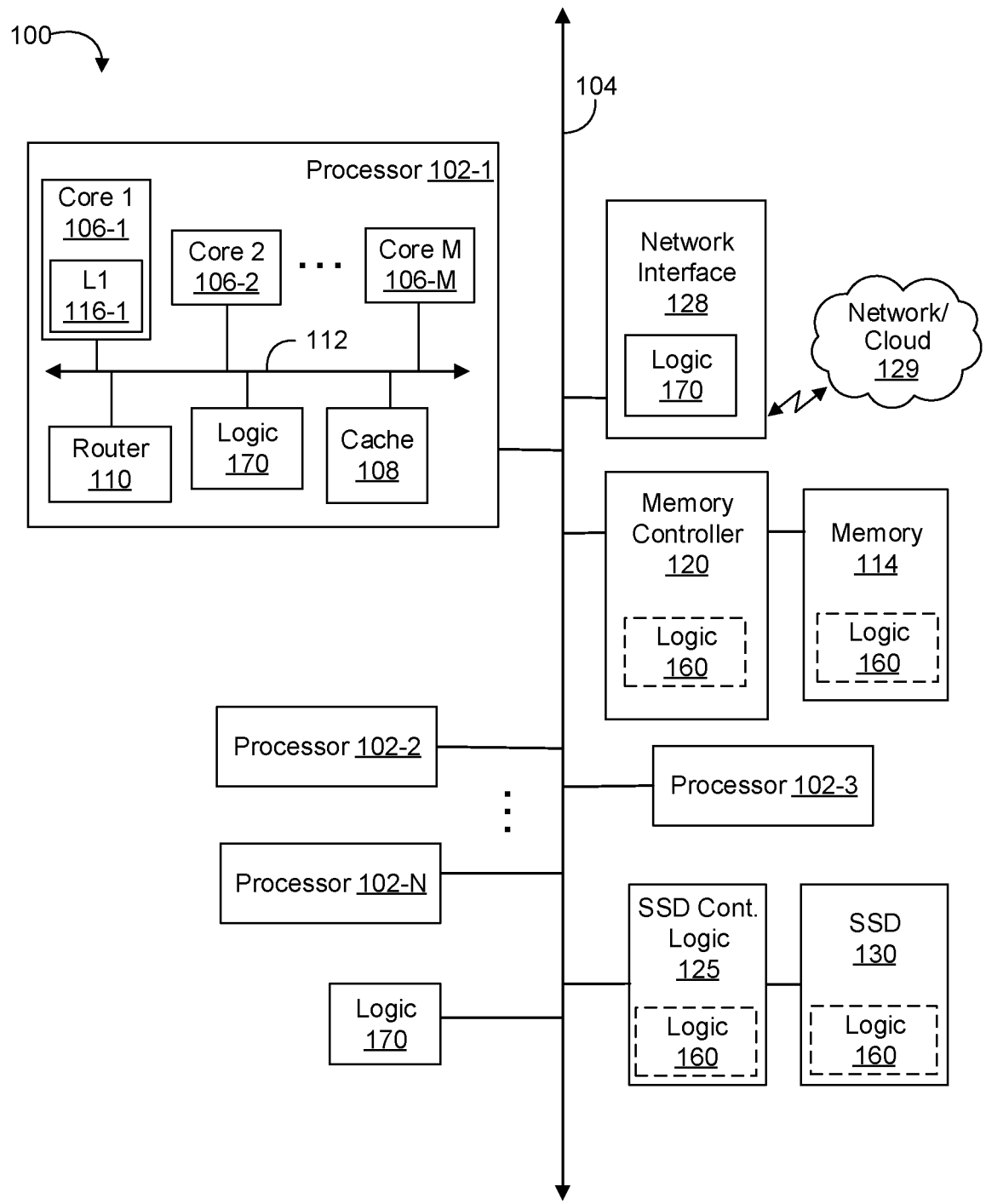
FIG. 6 is a block diagram of another example of a computing system according to an embodiment.

Turning now to FIG. 6, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 6, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 6, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a storage device such as a SSD device 130 coupled to the interconnect 104 via SSD controller logic 125. Hence, logic 125 may control access by various components of system 100 to the SSD device 130. Furthermore, even though logic 125 is shown to be directly coupled to the interconnection 104 in FIG. 6, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc.) Additionally, logic 125 may be incorporated into memory controller logic (such as those discussed with reference to FIG. 7) or provided on a same integrated circuit (IC) device in various embodiments (e.g., on the same circuit board device as the SSD device 130 or in the same enclosure as the SSD device 130).

Furthermore, logic 125 and/or SSD device 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD device 130, SSD bus, SATA bus, logic 125, logic 160, logic 170, etc., to sense variations in various factors affecting power/thermal behavior of the system/platform, such as temperature, operating frequency, operating voltage, power consumption, and/or inter-core communication activity, etc.

Figure 7:
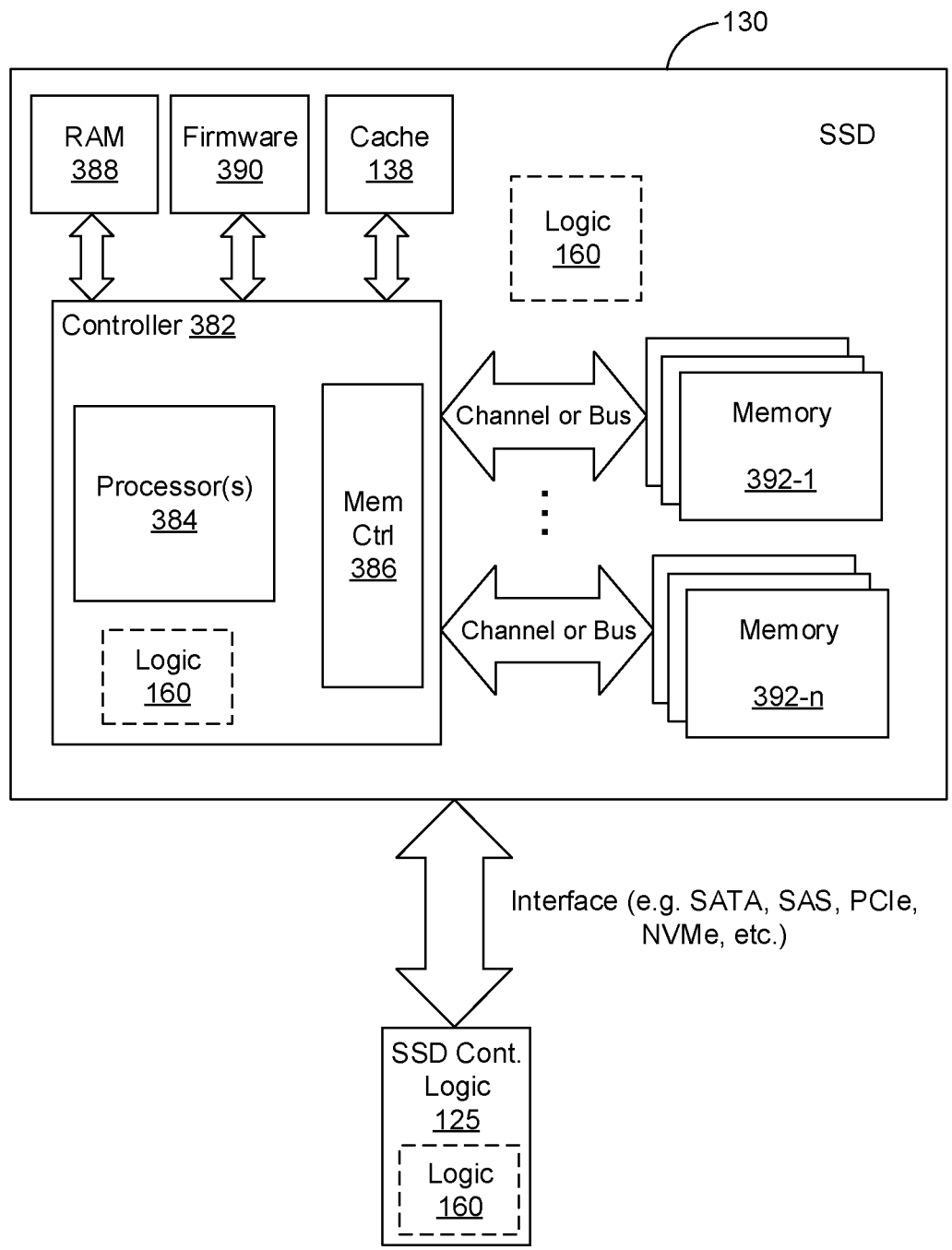
FIG. 7 is a block diagram of an example of a solid state drive (SSD) device according to an embodiment.

FIG. 7 illustrates a block diagram of various components of the SSD device 130, according to an embodiment. As illustrated in FIG. 7, logic 160 may be located in various locations such as inside the SSD device 130 or controller 382, etc. (or inside memory controller 120 or memory 114), and may include similar technology as discussed in connection with FIG. 6. The SSD device 130 includes a controller 382 (which in turn includes one or more processor cores or processors 384 and memory controller logic 386), cache 138, RAM 388, firmware storage 390, and one or more memory devices 392-1 to 392-N (collectively memory 392, which may include 3D crosspoint, or other types of non-volatile memory). The memory 392 is coupled to the memory controller logic 386 via one or more memory channels or busses. Also, SSD device 130 communicates with logic 125 via an interface (such as a SATA, SAS, PCIe, NVMe, etc., interface). Processors 384 and/or controller 382 may compress/decompress data written to or read from memory devices 392-1 to 392-N.

As illustrated in FIGS. 6 and 7, the SSD device 130 may include logic 160, which may be in the same enclosure as the SSD device 130 and/or fully integrated on a printed circuit board (PCB) of the SSD device 130. The system 100 may include further logic 170 outside of the SSD device 130. One or more of the features/aspects/operations discussed with reference to FIGS. 1-5 may be performed by one or more of the components of FIGS. 6 and/or 7. Also, one or more of the features/aspects/operations of FIGS. 1-5 may be programmed into the firmware 390. Further, SSD controller logic 125 may also include logic 160. Advantageously, the logic 160 and/or logic 170 may include technology to implement one or more aspects of the system 10 (FIG. 1), the apparatus 15 (FIG. 2), the method 20 (FIGS. 3A to 3C), the environment 40 (FIG. 4), the system 50 (FIG. 5), and/or any of the features discussed herein. For example, the logic 170 may include technology to implement the host device/computer system/agent or discrete target device aspects of the various embodiments described herein while the logic 160 may include technology to implement the storage/memory device aspects of the various embodiments described herein.

In particular, the logic 160 may be configured to receive a current access request for the memory devices 392 associated with a stream, identify a hint in the current access request which indicates one or more stream characteristics for future access requests from the stream, and handle the current access request based on the indicated one or more stream characteristics for future access requests from the stream. For example, the logic 160 may be configured to determine one or more of a latency and bandwidth requirement for the stream based on the hint, to determine a priority for the stream based on the hint, and/or to determine a granularity of access requests for the stream based on the hint. In some embodiments, the logic 160 may be further configured to schedule the current access request based on the indicated one or more stream characteristics for future access requests from the stream. For example, the logic 160 may also be configured to combine the current access request with one or more of the future access requests from the stream.

In other embodiments, the SSD device 130 may be replaced with any suitable storage/memory technology/media. In some embodiments, the logic 160/170 may be coupled to one or more substrates (e.g., silicon, sapphire, gallium arsenide, printed circuit board (PCB), etc.), and may include transistor channel regions that are positioned within the one or more substrates. In other embodiments, the SSD device 130 may include two or more types of storage media. For example, the bulk of the storage may be NAND and may further include some faster, smaller granularity accessible (e.g., byte-addressable) NVM such as INTEL 3DXP media. The SSD device 130 may alternatively, or additionally, include persistent volatile memory (e.g., battery or capacitor backed-up DRAM or SRAM). For example, the SSD device 130 may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the persistent volatile memory. As shown in FIG. 6, features or aspects of the logic 160 and/or the logic 170 may be distributed throughout the system 100, and/or co-located/integrated with various components of the system 100.

Additional Notes and Examples

Example 1 includes an electronic apparatus, comprising one or more substrates, and logic coupled to the one or more substrates, the logic to receive a current access request for a storage media associated with a stream, identify a hint in the current access request which indicates one or more stream characteristics for future access requests from the stream, and handle the current access request based on the indicated one or more stream characteristics for future access requests from the stream.

Example 2 includes the apparatus of claim 1, wherein the logic is further to determine one or more of a latency and bandwidth requirement for the stream based on the hint.

Example 3 includes the apparatus of any of claims 1 to 2, wherein the logic is further to determine a priority for the stream based on the hint.

Example 4 includes the apparatus of any of claims 1 to 3, wherein the logic is further to determine a granularity of access requests for the stream based on the hint.

Example 5 includes the apparatus of any of claims 1 to 4, wherein the logic is further to schedule the current access request based on the indicated one or more stream characteristics for future access requests from the stream.

Example 6 includes the apparatus of claim 5, wherein the logic is further to combine the current access request with one or more of the future access requests from the stream.

Example 7 includes the apparatus of any of claims 1 to 6, wherein the storage media comprises a solid state drive.

Example 8 includes an electronic system, comprising storage media, and a controller communicatively coupled to the storage media, the controller including logic to receive a current access request for the storage media associated with a stream, identify a hint in the current access request which indicates one or more stream characteristics for future access requests from the stream, and handle the current access request based on the indicated one or more stream characteristics for future access requests from the stream.

Example 9 includes the system of claim 8, wherein the logic is further to determine one or more of a latency and bandwidth requirement for the stream based on the hint.

Example 10 includes the system of any of claims 8 to 9, wherein the logic is further to determine a priority for the stream based on the hint.

Example 11 includes the system of any of claims 8 to 10, wherein the logic is further to determine a granularity of access requests for the stream based on the hint.

Example 12 includes the system of any of claims 8 to 11, wherein the logic is further to schedule the current access request based on the indicated one or more stream characteristics for future access requests from the stream.

Example 13 includes the system of claim 12, wherein the logic is further to combine the current access request with one or more of the future access requests from the stream.

Example 14 includes the system of any of claims 8 to 13, wherein the storage media comprises a solid state drive.

Example 15 includes a method of controlling storage, comprising receiving a current access request for a storage media associated with a stream, identifying a hint in the current access request which indicates one or more stream characteristics for future access requests from the stream, and handling the current access request based on the indicated one or more stream characteristics for future access requests from the stream.

Example 16 includes the method of claim 15, further comprising determining one or more of a latency and bandwidth requirement for the stream based on the hint.

Example 17 includes the method of any of claims 15 to 16, further comprising determining a priority for the stream based on the hint.

Example 18 includes the method of any of claims 15 to 17, further comprising determining a granularity of access requests for the stream based on the hint.

Example 19 includes the method of any of claims 15 to 18, further comprising scheduling the current access request based on the indicated one or more stream characteristics for future access requests from the stream.

Example 20 includes the method of claim 19, further comprising combining the current access request with one or more of the future access requests from the stream.

Example 21 includes the method of any of claims 15 to 20, wherein the storage media comprises a solid state drive.

Example 22 includes at least one non-transitory one machine readable medium comprising a plurality of instructions that, in response to being executed on a computing device, cause the computing device to receive a current access request for a memory media associated with a stream, identify a hint in the current access request which indicates one or more stream characteristics for future access requests from the stream, and handle the current access request based on the indicated one or more stream characteristics for future access requests from the stream.

Example 23 includes the at least one non-transitory one machine readable medium of claim 22, comprising a plurality of further instructions that, in response to being executed on the computing device, cause the computing device to determine one or more of a latency and bandwidth requirement for the stream based on the hint.

Example 24 includes the at least one non-transitory one machine readable medium of any of claims 22 to 23, comprising a plurality of further instructions that, in response to being executed on the computing device, cause the computing device to determine a priority for the stream based on the hint.

Example 25 includes the at least one non-transitory one machine readable medium of any of claims 22 to 24, comprising a plurality of further instructions that, in response to being executed on the computing device, cause the computing device to determine a granularity of access requests for the stream based on the hint.

Example 26 includes the at least one non-transitory one machine readable medium of any of claims 22 to 25, comprising a plurality of further instructions that, in response to being executed on the computing device, cause the computing device to schedule the current access request based on the indicated one or more stream characteristics for future access requests from the stream.

Example 27 includes the at least one non-transitory one machine readable medium of claim 26, comprising a plurality of further instructions that, in response to being executed on the computing device, cause the computing device to combine the current access request with one or more of the future access requests from the stream.

Example 28 includes the at least one non-transitory one machine readable medium of any of claims 22 to 27, wherein the memory media comprises persistent memory media.

Example 29 includes a controller apparatus, comprising means for receiving a current access request for a memory media associated with a stream, means for identifying a hint in the current access request which indicates one or more stream characteristics for future access requests from the stream, and means for handling the current access request based on the indicated one or more stream characteristics for future access requests from the stream.

Example 30 includes the apparatus of claim 29, further comprising means for determining one or more of a latency and bandwidth requirement for the stream based on the hint.

Example 31 includes the apparatus of any of claims 29 to 30, further comprising means for determining a priority for the stream based on the hint.

Example 32 includes the apparatus of any of claims 29 to 31, further comprising means for determining a granularity of access requests for the stream based on the hint.

Example 33 includes the apparatus of any of claims 29 to 32, further comprising means for scheduling the current access request based on the indicated one or more stream characteristics for future access requests from the stream.

Example 34 includes the apparatus of claim 33, further comprising means for combining the current access request with one or more of the future access requests from the stream.

Example 35 includes the apparatus of any of claims 29 to 34, wherein the memory media comprises a persistent memory media.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   one or more substrates; and
   integrated circuitry coupled to the one or more substrates, the integrated circuitry to:
   receive a current access request for a storage media associated with a stream,
   identify a hint in the current access request which indicates stream characteristics for future access requests from the stream, the stream characteristics comprising a latency and a bandwidth requirement,
   determine a priority for the stream based on each of the latency and the bandwidth requirement, and
   handle the current access request based on the indicated stream characteristics for future access requests from the stream, comprising the integrated circuitry to:
   schedule the current access request based on the priority, and
   combine the current access request with one or more of the future access requests.

2. The apparatus of claim 1, wherein the integrated circuitry is further to:
   determine a granularity of access requests for the stream based on the hint.

3. The apparatus of claim 2, wherein the integrated circuitry is to:
   schedule the current access request further based on the granularity of access requests for the stream.

4. The apparatus of claim 1, wherein the storage media comprises a solid state drive.

5. An electronic system, comprising:
   storage media; and
   a controller communicatively coupled to the storage media, the controller including integrated circuitry to:
   receive a current access request for the storage media associated with a stream,
   identify a hint in the current access request which indicates stream characteristics for future access requests from the stream, the stream characteristics comprising a latency and a bandwidth requirement,
   determine a priority for the stream based on each of the latency and the bandwidth requirement, and
   handle the current access request based on the indicated stream characteristics for future access requests from the stream, comprising the integrated circuitry to:
   schedule the current access request based on the priority, and
   combine the current access request with one or more of the future access requests.

6. The system of claim 5, wherein the integrated circuitry is further to:
   determine a granularity of access requests for the stream based on the hint.

7. The system of claim 6, wherein the integrated circuitry is to:
   schedule the current access request further based on the granularity of access requests for the stream.

8. The system of claim 5, wherein the storage media comprises a solid state drive.

9. A method of controlling storage, comprising:
   receiving a current access request for a storage media associated with a stream;
   identifying a hint in the current access request which indicates stream characteristics for future access requests from the stream, the stream characteristics comprising a latency and a bandwidth requirement;
   determining a priority for the stream based on each of the latency and the bandwidth requirement; and
   handling the current access request based on the indicated stream characteristics for future access requests from the stream, comprising:
   scheduling the current access request based on the priority; and
   combining the current access request with one or more of the future access requests.

10. The method of claim 9, further comprising:
    determining a granularity of access requests for the stream based on the hint.

11. The method of claim 10, further comprising:
    scheduling the current access request further based on the granularity of access requests for the stream.

* * * * *